United States Patent
Zhuang et al.

(10) Patent No.: US 8,804,671 B2
(45) Date of Patent: Aug. 12, 2014

(54) METHOD AND APPARATUS FOR DETERMINING UE MOBILITY STATUS

(75) Inventors: Jiandong Zhuang, Ottawa (CA); Xixian Chen, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 398 days.

(21) Appl. No.: 13/047,487

(22) Filed: Mar. 14, 2011

(65) Prior Publication Data

US 2012/0014425 A1 Jan. 19, 2012

Related U.S. Application Data (63) Continuation-in-part of application No. PCT/IB2010/002070, filed on Jul. 15, 2010.

(51) Int. Cl.
*H04W 4/00* (2009.01)
*H04W 4/02* (2009.01)
*G01S 13/58* (2006.01)
*G01S 15/58* (2006.01)
*G01S 15/89* (2006.01)
*G01S 1/78* (2006.01)
*G01S 5/00* (2006.01)

(52) U.S. Cl.
CPC .............. *H04W 4/027* (2013.01); *H04W 4/025* (2013.01); *H04W 4/028* (2013.01); *G01S 13/589* (2013.01); *G01S 15/588* (2013.01); *G01S 15/58* (2013.01); *G01S 15/8984* (2013.01); *G01S 1/78* (2013.01); *G01S 1/783* (2013.01); *G01S 5/00* (2013.01); *G01S 2205/001* (2013.01); *G01S 2205/002* (2013.01); *G01S 2205/008* (2013.01)
USPC ............ 370/332; 370/252; 370/253; 370/333

(58) Field of Classification Search
None
See application file for complete search history.

(56) References Cited

U.S. PATENT DOCUMENTS

| | | | | |
|---|---|---|---|---|
| 4,817,146 A * | 3/1989 | Szczutkowski et al. | ...... | 380/261 |
| 7,280,615 B2 * | 10/2007 | Roberts | ......... | 375/316 |
| 7,843,887 B2 * | 11/2010 | Haga et al. | ...... | 370/332 |
| 2001/0031021 A1 * | 10/2001 | Fujimura et al. | ............ | 375/324 |
| 2002/0097668 A1 * | 7/2002 | Izumi | ............ | 370/208 |

(Continued)

FOREIGN PATENT DOCUMENTS

| | | |
|---|---|---|
| EP | 1 592 139 A2 | 11/2005 |
| WO | WO 2010/120217 | 10/2010 |
| WO | WO 2011/007258 | 1/2011 |

OTHER PUBLICATIONS

International Preliminary Report on Patentability, Jun. 15, 2012, in Application No. PCT/IB2011/001535.

(Continued)

*Primary Examiner* — Faruk Hamza
*Assistant Examiner* — Andrew Oh
(74) *Attorney, Agent, or Firm* — Nixon & Vanderhye P.C.

(57) ABSTRACT

A radio user equipment (UE) mobility status is determined in a communications node. UE mobility status measurements associated with the UE communicating over a radio channel are performed. The UE mobility status corresponds to a degree of variation of the radio channel over time. Channel characteristics of the radio channel at a first time and at a second later time are determined. Based on the determined channel characteristics, a channel characteristic error metric is determined and compared to a predetermined threshold. The UE mobility status is determined based on one or more iterations of the threshold comparison.

45 Claims, 6 Drawing Sheets

(56) References Cited

U.S. PATENT DOCUMENTS

| | | | |
|---|---|---|---|
| 2003/0128770 A1* | 7/2003 | Chenu-Tournier et al. | 375/267 |
| 2005/0025244 A1* | 2/2005 | Lee et al. | 375/240.16 |
| 2005/0036297 A1* | 2/2005 | Thomas et al. | 362/42 |
| 2005/0063297 A1* | 3/2005 | Sakata et al. | 370/208 |
| 2005/0265226 A1* | 12/2005 | Shen et al. | 370/210 |
| 2006/0092875 A1* | 5/2006 | Yang et al. | 370/329 |
| 2006/0165188 A1* | 7/2006 | Wunder et al. | 375/260 |
| 2006/0291578 A1* | 12/2006 | Singh et al. | 375/260 |
| 2007/0064825 A1* | 3/2007 | Izumi | 375/260 |
| 2007/0070944 A1* | 3/2007 | Rinne et al. | 370/329 |
| 2007/0115796 A1* | 5/2007 | Jeong et al. | 370/203 |
| 2007/0147533 A1 | 6/2007 | Thomas et al. | |
| 2007/0201350 A1* | 8/2007 | Papasakellariou | 370/208 |
| 2007/0274252 A1* | 11/2007 | Zhang et al. | 370/328 |
| 2008/0049814 A1 | 2/2008 | Jeon | |
| 2008/0080630 A1* | 4/2008 | Sung | 375/260 |
| 2008/0089278 A1* | 4/2008 | Chang et al. | 370/329 |
| 2008/0089395 A1* | 4/2008 | Cairns | 375/148 |
| 2008/0101286 A1* | 5/2008 | Wang et al. | 370/329 |
| 2008/0130512 A1* | 6/2008 | Park et al. | 370/252 |
| 2008/0144752 A1* | 6/2008 | Zhou et al. | 375/347 |
| 2008/0151989 A1* | 6/2008 | Von Elbwart et al. | 375/239 |
| 2008/0159417 A1* | 7/2008 | Yin et al. | 375/260 |
| 2008/0181325 A1* | 7/2008 | Park et al. | 375/260 |
| 2008/0192857 A1* | 8/2008 | Miyoshi et al. | 375/285 |
| 2008/0233945 A1* | 9/2008 | Gummadi et al. | 455/422.1 |
| 2008/0298482 A1* | 12/2008 | Rensburg et al. | 375/260 |
| 2008/0310532 A1* | 12/2008 | Baggen et al. | 375/260 |
| 2009/0080504 A1* | 3/2009 | Li et al. | 375/220 |
| 2009/0086648 A1* | 4/2009 | Xu et al. | 370/252 |
| 2009/0170437 A1* | 7/2009 | Bhattad et al. | 455/63.1 |
| 2009/0238123 A1* | 9/2009 | Kuri et al. | 370/329 |
| 2009/0252138 A1* | 10/2009 | Alizadeh-Shabdiz et al. | 370/338 |
| 2009/0257516 A1* | 10/2009 | Hsieh et al. | 375/260 |
| 2009/0257520 A1* | 10/2009 | Lin et al. | 375/260 |
| 2009/0296799 A1* | 12/2009 | Casas et al. | 375/231 |
| 2009/0310656 A1* | 12/2009 | Maltsev et al. | 375/219 |
| 2010/0080084 A1* | 4/2010 | Chen et al. | 367/118 |
| 2010/0183101 A1* | 7/2010 | Mundarath et al. | 375/341 |
| 2010/0246507 A1* | 9/2010 | Dan | 370/329 |
| 2010/0246559 A1* | 9/2010 | Ogawa et al. | 370/345 |
| 2010/0322161 A1* | 12/2010 | Choi et al. | 370/329 |
| 2011/0007643 A1* | 1/2011 | Liang et al. | 370/252 |
| 2011/0009071 A1* | 1/2011 | Stager et al. | 455/67.16 |
| 2011/0051835 A1* | 3/2011 | Yuan et al. | 375/267 |
| 2011/0051863 A1* | 3/2011 | Furukawa et al. | 375/343 |
| 2011/0096680 A1 | 4/2011 | Lindoff et al. | |
| 2011/0150154 A1* | 6/2011 | Chen | 375/350 |
| 2011/0164698 A1* | 7/2011 | Wu | 375/261 |
| 2011/0230201 A1* | 9/2011 | Hotes et al. | 455/456.1 |
| 2011/0255483 A1* | 10/2011 | Xu et al. | 370/329 |
| 2011/0255572 A1* | 10/2011 | Giannakis et al. | 375/146 |
| 2011/0292926 A1* | 12/2011 | Clerckx et al. | 370/342 |
| 2012/0026960 A1* | 2/2012 | Okubo et al. | 370/329 |
| 2012/0057456 A1* | 3/2012 | Bogatin et al. | 370/230.1 |

OTHER PUBLICATIONS

International Search Report and Written Opinion of the International Searching Authority mailed Oct. 4, 2011 in corresponding International Application No. PCT/IB/2011/001535.

* cited by examiner

METHOD AND APPARATUS FOR DETERMINING UE MOBILITY STATUS

RELATED APPLICATION

This application is a continuation-in-part of PCT parent patent application, PCT/IB2010/002070, filed on Jul. 15, 2010, the disclosure of which is incorporated herein by reference.

TECHNICAL FIELD

The technology relates to radio communications, and in particular, detecting radio channel variations.

INTRODUCTION

In this application, the term "UE mobility status," for a user equipment (UE) communicating in some fashion via a radio channel, corresponds to a degree of variation of the radio channel over time. In a cellular communications system, (LTE is one non-limiting example), the mobility status of a UE can provide useful information for the design of many technologies employed by the system, such as uplink channel estimation, closed-loop MIMO, multi-user MIMO (v-MIMO), adaptive antenna beamforming, radio resource scheduling, interference management, etc. For example, these technologies can be designed to be more effective and efficient if the UE mobility status is known.

The parent PCT patent application, PCT/IB2010/002070, filed on Jul. 15, 2010, the disclosure of which is incorporated herein by reference, describes uplink channel estimation designed to have two UE mobility status modes. In that application, channel estimation employs an averaging algorithm when the UE is in a low UE mobility status and an interpolation algorithm when the UE is in a high UE mobility status. This type of dual-UE mobility status mode channel estimation is more effective and efficient than single-UE mobility status mode estimation, either using the averaging only or the interpolation only, under various channel conditions. But UE mobility status may be used in a variety of other example applications. One example application that provides significant gains is using closed-loop MIMO when the UE is in LOW UE mobility status and uplink v-MIMO when paired or grouped UEs are in the LOW UE mobility status.

The problem addressed in this application is how to determine UE mobility status for wide use in a variety of applications and technologies effectively, efficiently, and in a real-time manner. For example, in the downlink closed-loop MIMO application, UEs measure downlink channel quality information (CQI) and report it to a serving base station via an uplink control channel that forms the closed loop. These UEs must move slowly so that the downlink channel variation caused by the UE mobility is small enough over the time of the CQI reporting period to ensure that the reported CQI represents the actual channel quality more closely and accurately. As such, a mechanism which can effectively and in a real-time manner determine the UE mobility status is important for the downlink closed-loop MIMO technology to achieve its desired design gain. For this type of application, the uplink channel estimation procedure to determine the UE mobility status on a 1-millisecond time scale may need to be extended to a hundreds-of-milliseconds in order to cover new scenarios.

SUMMARY

A radio user equipment (UE) mobility status is determined in a radio communications node. UE mobility status measurements associated with the UE communicating over a radio channel are performed. The UE mobility status corresponds to a degree of variation of the radio channel over at least one of time and frequency. Channel characteristics of the radio channel at a first time and at a second later time are determined. Based on the determined channel characteristics, a channel characteristic error metric is determined and compared to a predetermined threshold. The UE mobility status is determined based on one or more iterations of the threshold comparison. One factor typically affecting the UE mobility status is movement of the UE from the first time to the second time.

In one example, the UE mobility status includes a first state corresponding to a higher UE mobility status indicating a higher degree of channel variation and a second state corresponding to a lower UE mobility status indicating a lower degree of channel variation. The UE mobility status may also includes three or more different UE mobility states and two or more different predetermined thresholds.

The UE mobility status may be determined per UE, per radio resource block, where a radio resource block may be allocated to multiple UEs at the same time for radio communication, and/or per group of multiple radio resource blocks.

In one example, the channel characteristics determined at the first time and at the second later time are produced based on N subcarriers, N being a variable integer greater than one. A value of N is preferably set large enough to achieve a desired noise suppression.

In an example embodiment, steps a-e are performed for multiple iterations. A result of each iteration is a UE mobility state event corresponding to one of multiple different possible UE mobility states. The UE mobility status is determined based on UE mobility state events resulting from the multiple iterations. An event rate may be determined corresponding to one of the multiple different possible UE mobility states produced over a number of iterations performed divided by the number of iterations performed. The determined event rate may then be compared to a predefined rate threshold. The UE mobility status may be determined based on the rate threshold comparison. Depending on example implementations, the event rate may be determined per UE, per radio resource block, or per group of resource blocks over a predetermined time interval.

One example embodiment determines UE mobility status using uplink transmitted reference sequences. A reference sequence from the UE received at a first time is used to determine the channel characteristic of the radio channel at the first time, and a reference sequence received at a second later time is used to determine the channel characteristic of the radio channel at the second time. Different types of reference sequences may be used for different applications. A time interval between the first time and the second time may depend on the type of reference sequence used. In one example application, each reference sequence includes a number of frequency subcarriers, and the number of frequency subcarriers depends on a configuration or made by the radio communications node. The processing of the reference sequences to determine the channel characteristic can be performed per radio resource block for a first application of the method and can be performed per UE for a second different application of the method.

Another example embodiment determines UE mobility status using uplink transmitted data symbols. The received data symbols from the UE are decoded and checked for accuracy. UE transmitted data symbols reconstructed from at least one accurately decoded data symbol are used to determine the channel characteristic of the radio channel at least one of the first time and second time. The data symbols may either be payload data symbols or signaling data symbols.

One example application uses the determined UE mobility status for uplink channel estimation such that a first type of channel estimation algorithm is used when the determined UE mobility status is in a first state and a second type of channel estimation algorithm is used when the determined UE mobility status is in a second different state. The UE mobility status for uplink channel estimation may be determined per radio resource block in one example implementation. Moreover, a first type of channel estimation algorithm can be used for one radio resource block, and a second different type of channel estimation algorithm can be used for another radio resource block. In another example implementation, the UE mobility status for uplink channel estimation is determined per group of multiple radio resource blocks.

Another example application uses the determined UE mobility status for selecting a MIMO scheme for use at the radio communications node such that a first type of MIMO scheme is used when the determined UE mobility status is in a first state and a second type of MIMO scheme is used when the determined UE mobility status is in a second different state. One or more UEs whose UE mobility status is in a low state may be identified for a downlink closed-loop MIMO application, and one or more UEs whose mobility status is low may be identified for an uplink multi-user MIMO application.

Yet another example application uses the determined UE mobility status for selecting an adaptive antenna beamforming scheme for use at the radio communications node such that a first type of adaptive antenna beamforming scheme is used when the determined UE mobility status is in a first state and a second type of adaptive antenna beamforming scheme is used when the determined UE mobility status is in a second different state. For a low UE mobility status, multi-antenna beamforming adaptation is selected, and for a high UE mobility status, a single beam antenna scheme is selected.

Non-limiting example channel characteristic error metrics include: a mean error between the channel characteristic determined at the first time and the channel characteristic determined at the second time, a mean square error between the channel characteristic determined at the first time and the channel characteristic determined at the second time, and a correlation between the channel characteristic determined at the first time and the channel characteristic determined at the second time.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology may be applied to any cellular communications system and/or network. Herein, a radio user equipment (UE) is understood to be any type of mobile radio node, e.g., mobile station (MS), terminal, laptop, PDAs, small base station, sensor, relay, etc. A network node can be any node that can communicate with a UE to access the network such as a base station node, relay node, pico cell, femto cell, Personal Area Network node, UE functioning as an eNodeB, WiFi Access Point and the like.

UE mobility causes wireless channel fading phenomenon that strongly affects radio channel characteristics in both the frequency domain and the time domain, resulting in a channel characteristic response that varies in frequency and time. Different UE mobility speeds generate different Doppler effects which may reflect different degrees of channel variation in time and frequency given other channel conditions. Although the speed or velocity of the UE is usually the most significant factor affecting UE mobility status, it is not always the most significant and there are often other factors. Regardless of the factors involved, UE mobility status is a metric of a degree of variation in radio channel characteristic response over a certain period of time, e.g., when a UE (moving or stationary) sends measurement signals to its serving eNodeB. UE mobility status depends on the definition of one or more metrics used to reflect the degree of channel variation and one or more design parameters which may be determined by the performance of the system in which the technology is used.

One type of systems includes cellular communication systems. Many cellular communication systems use some form of Orthogonal Frequency Division Multiple Access (OFDMA) technology where the data transmission is split into several sub-streams, and each sub-stream is modulated on a separate sub-carrier. OFDMA-based systems sub-divide the available bandwidth into radio resource blocks (RBs) defined in both time, frequency, code, and/or any combination thereof. As one non-limiting LTE-based example, a resource block could be 180 KHz and 0.5 ms in the frequency and time domains, respectively. The overall/available uplink and downlink transmission bandwidth can be very large, e.g., 20 MHz, 100 MHz, etc.

As an overview, a network node receives UE mobility status measurements relating to the variation of a radio channel characteristic response caused by UE mobility and other factors to estimate magnitude of channel variation between two fixed time instants. This may be done, in one non-limiting example embodiment, by using received known reference signals such as demodulation reference signals (DMRS) sent by the concerned UE over a physical uplink shared channel (PUSCH) or sounding reference signals (SRS) sent over a sounding reference channel. In another non-limiting example embodiment, decoded, cyclic redundancy checked (CRC) UE data received on the PUSCH or the physical uplink control channel (PUCCH) may also be used to improve the accuracy of UE mobility status measurements in order to achieve more accurate channel estimation.

In both example embodiments, the magnitude of the channel characteristic response variation between two time instants is compared with a predetermined magnitude threshold to initially decide an associated UE mobility status for the UE, e.g., a HIGH status or a LOW status in a two mode status implementation. This initial decision is preferably followed one or more additional decision iterations of the associated UE mobility status to make a final decision based on a rate of a certain UE mobility status event happening within a specified number of UE mobility status determination iterations.

Techniques for determining a suitable magnitude threshold, number of iterations, and rate threshold are described below, but concrete values for these design parameters are preferably determined depending on the particular application. In addition, the metrics used for UE mobility status determination may be processed per UE, per radio resource block (RB), or per a group of multiple RBs. The processing per RB or group of RBs may be performed independently of a particular UE. The per RB or group of RBs approaches may be advantageous (1) in situations where different RBs might experience different channel variation in the frequency domain, even if the UE movement remains constant, (2) to reduce implementation costs because there is no need to identify each particular UE, (3) to enable independent parallel processing of channel estimation and maximum likelihood combining (MRC)/interference reduction combining (IRC), and (4) to generate more measurement events for calculating the rate measurement for the final determination.

Figure 1A:
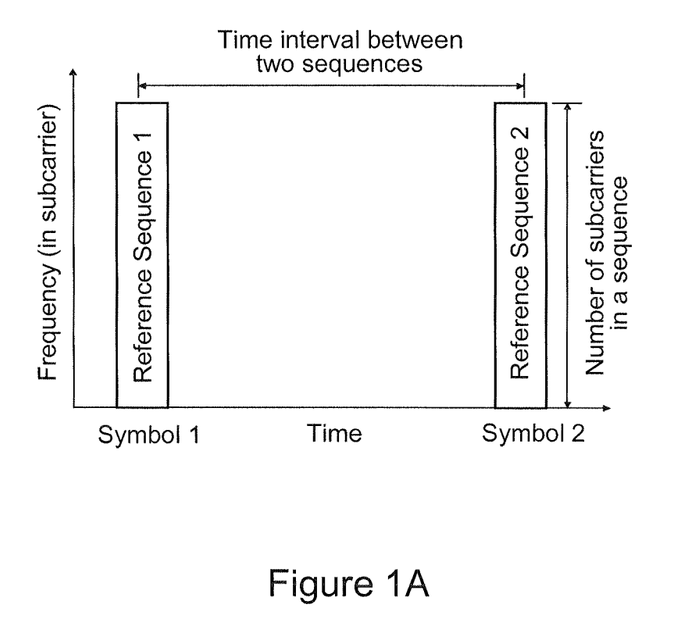
FIG. 1A is a non-limiting example of a two dimensional signal model for UE mobility status measurement.

To estimate and determine the mobility status of a UE, some type of measurement on the UE mobility must be obtained that reflects the UE mobility status effectively and preferably in a real-time manner. The measurement on a UE's uplink radio channel characteristic variation over time is preferred. FIG. 1A is a two dimensional signal model for UE mobility status measurement. One dimension is in frequency, and the other is in time. Two example reference sequences (RSs) known to the network node, e.g., the receiver of an eNodeB in a LTE system, are transmitted over an uplink radio channel by the UE to the network node. In this non-limiting LTE example, each reference sequence occupies one single carrier-frequency division multiple access (SC-FDMA) symbol in the time domain and a number of subcarriers in the frequency domain. The time interval between the two reference sequences (symbol 1 and symbol 2) is preferably long enough to effectively reflect channel characteristic variation with time, e.g., caused by UE mobility. Furthermore, the number of subcarriers of each reference sequence in the frequency domain is preferably large enough to permit sufficient noise suppression. However, the time interval between two reference sequences and the number of subcarriers of each reference sequence in the frequency domain may have any suitable values and are preferably determined based on each particular application in which the UE mobility status matters.

On the other hand, it may be that the reference signals and two parameters just described may be determined by a standard. For example, for the LTE application of PUSCH channel estimation with a dual UE mobility status mode estimation algorithm, two demodulation reference sequence symbols (DMRS) may be used in the place of the two general reference sequences of the model. In this case, the time interval between the two DMRSs is seven (7) SC-FDMA symbols, if a normal cyclic prefix (CP) is used in a subframe, and the number of subcarriers of each DMRS is an integer multiple of a resource block (RB) depending on how many RBs are assigned to the UE for this subframe. In this example, a RB contains 12 subcarriers if the subcarrier spacing is 15 KHz apart. Likewise, if SRS is used in this model for some application, two consecutive SRS symbols in time may be used, and the relevant time interval and the number of subcarriers may be given by a standard.

Figure 1B:
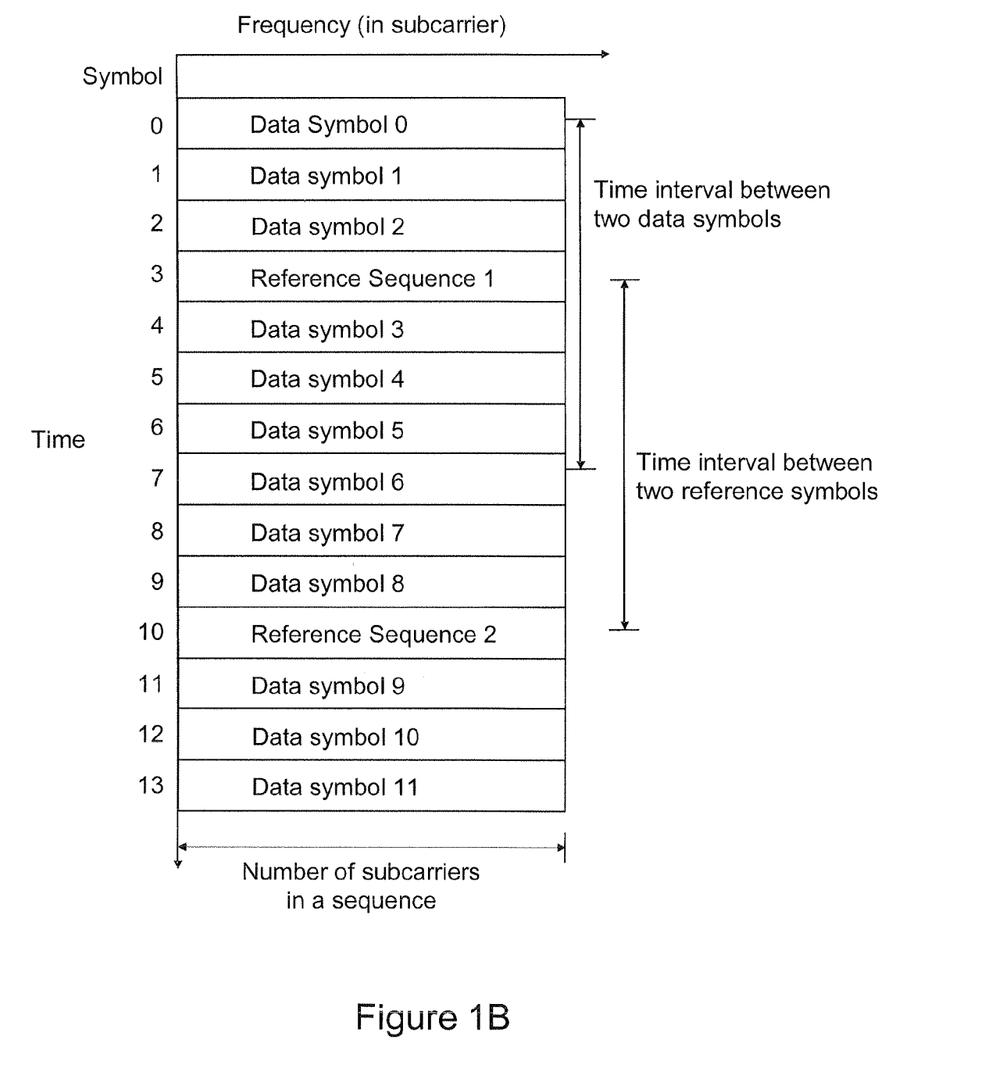
FIG. 1B is another non-limiting example of a two dimensional signal model for UE mobility status measurement.

FIG. 1B is another non-limiting example of a two dimensional signal model for UE mobility status measurement. This embodiment employs decoded and CRC-passed data received over a radio channel, e.g., the PUSCH or PUCCH in LTE, either alone or in combination with one or more reference signals. The example shown in FIG. 1B shows both data symbols and reference symbols which can be used together. Alternatively, only data symbols may be used or the time interval could be marked between a data symbol and a reference symbol. Using decoded and CRC-passed data symbols can improve the accuracy of uplink channel estimation as well as UE mobility status estimation. Multiple pairs of symbols can be formed in a time interval, e.g., a TTI, in multiple ways, such as symbol 0 versus symbol 7, symbol 1 versus symbol 8, . . . , etc. Initially, the original received signal for the time interval TTI is saved. Next, decoded data is obtained for example in known ways and checked for accuracy, e.g., by CRC check. Correctly decoded data is then used to reconstruct each received data symbol transmitted by an UE for the original data signal in the received TTI using the known modulation and coding scheme. The reconstructed data symbols are then used to remove the corresponding data information contained in the original received signal by multiplying each subcarrier sample of each originally received data symbol with the complex conjugate of the corresponding carrier sample of each reconstructed data symbol. The product of the multiplication provides a channel response sample corresponding to that subcarrier and that symbol. By using correctly decoded data, the resulting channel response samples should be more accurate than those obtained from the first-time channel estimation with two reference sequence symbols. Afterward, if a normal cyclic prefix is used, the channel response estimated using the decoded data at the first symbol is compared with that estimated at the seventh symbol. Likewise, the second symbol can be paired with the eighth symbol and so on.

Table 1 below gives some non-limiting examples for using the UE mobility measurement model in some typical applications.

TABLE 1

| Application | Sequence type | Time interval between two sequences | Number of subcarriers of a sequence | Sequence processing Per RB or Per UE |
|---|---|---|---|---|
| PUSCH channel estimation with a dual mode algorithm | DMRS | Interval between two DMRS symbols within a subframe | 12 if processing per RB; or an integer multiple of 12 if processing per UE or per group fo RBs | Can be either Per RB, a group of RBs or per UE, depending on algorithm implementation |
| Uplink v-MIMO with paired UEs in the LOW mobility. Adaptive antenna beamforming in terms of UE mobility status. | SRS | Interval between two consecutive SRS symbols | An integer multiple of 12 depending on configuration | Per UE only |
| Uplink v-MIMO with paired UEs in the LOW mobility. Adaptive antenna beamforming in terms of UE mobility status. | PUSCH or PUCCH | Time Interval can be configured either within a subframe or a number of subframes | An integer multiple of 12 depending on configuration | Per UE only |

Figure 2:
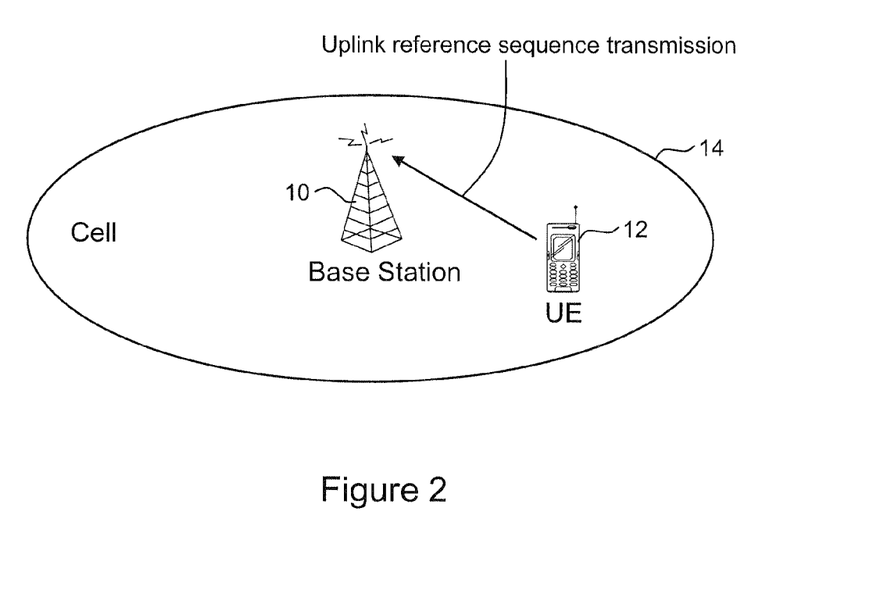
FIG. 2 shows a cellular communication system with a serving node and a served UE located within the serving node's geographical area of service or cell.

FIG. 2 shows a cellular communication system with a serving node (depending on the system, it can be called a base station, a Node B, an evolved Node B (eNodeB or eNB), etc.) that serves a user equipment (UE) 12 located within the serving node's geographical area of service, called a cell 14. Communication is bidirectional between the eNB 10 and the UE 12. Communications from the eNB 10 to the UE 12 are referred to as taking place in a downlink direction, whereas communications from the UE 12 to the eNB 10 are referred to as taking place in an uplink direction. The UE is shown performing a reference sequence transmission to its serving base station based on the reference signal model given in FIG. 1 over an uplink channel, e.g., such as a PUSCH or SRS channel in an LTE application.

Figure 3:
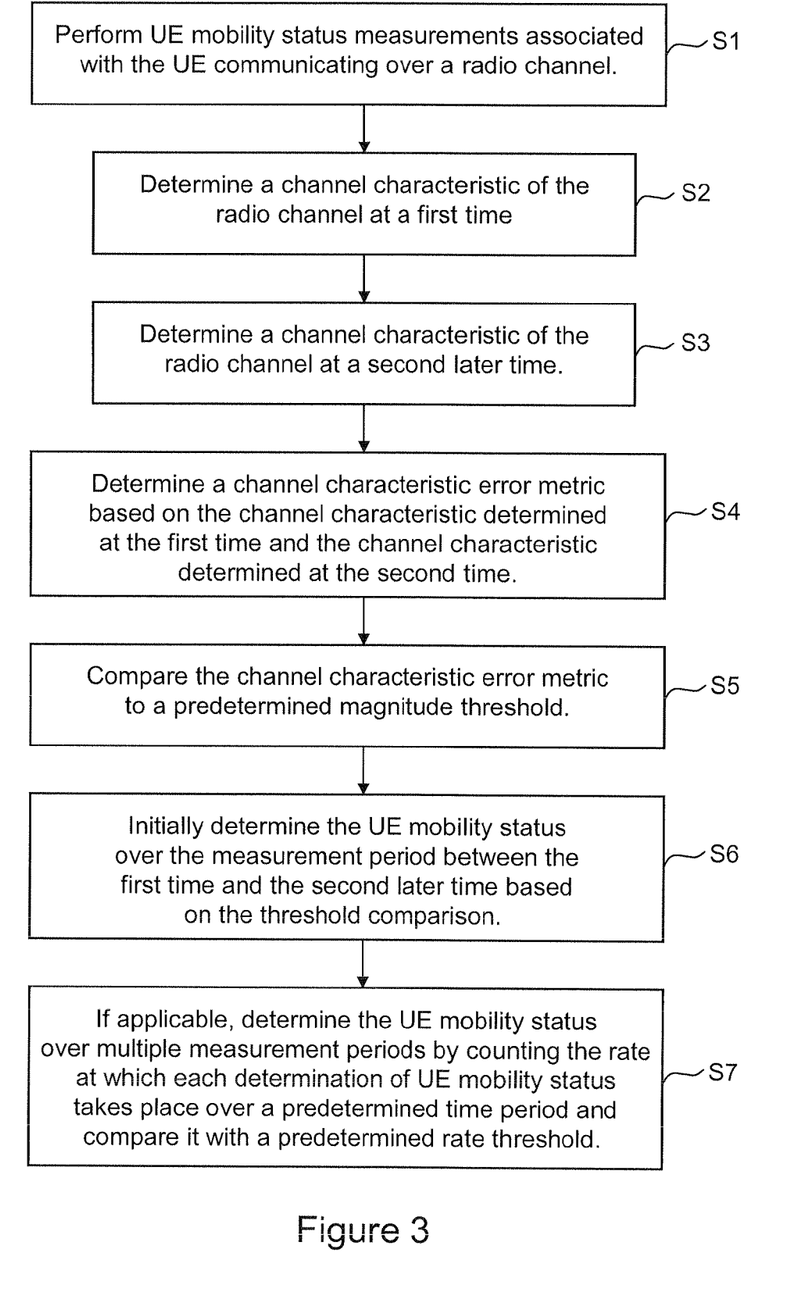
FIG. 3 is a non-limiting flowchart illustrating example procedures followed by a network node to determine UE mobility status.

FIG. 3 is a non-limiting flowchart illustrating example procedures followed by a network node, e.g., the base station in FIG. 2, to determine UE mobility status. The network node performs UE mobility status measurements associated with the UE communicating over a radio channel (step S1). Based on those measurements, a channel characteristic of the radio channel is determined at a first time and at a second later time (step S2). The network node determines a channel characteristic error metric based on the channel characteristic determined at the first time and the channel characteristic determined at the second time (step S3). The channel characteristic error metric is then compared to a predetermined magnitude threshold (step S4). An initial UE mobility status determination is made for the measurement period between the first time and the second later time based on the threshold comparison (step S5). Some applications may be satisfactorily handled with just this initial UE mobility status determination. Other applications may benefit with multiple UE mobility status determinations. In that case, the network node determines the UE mobility status over multiple measurement periods (step S6). The rate at which each determination of UE mobility status takes place over a predetermined time period is determined, and that rate is compared with a predetermined rate threshold (step S7).

Figure 4:
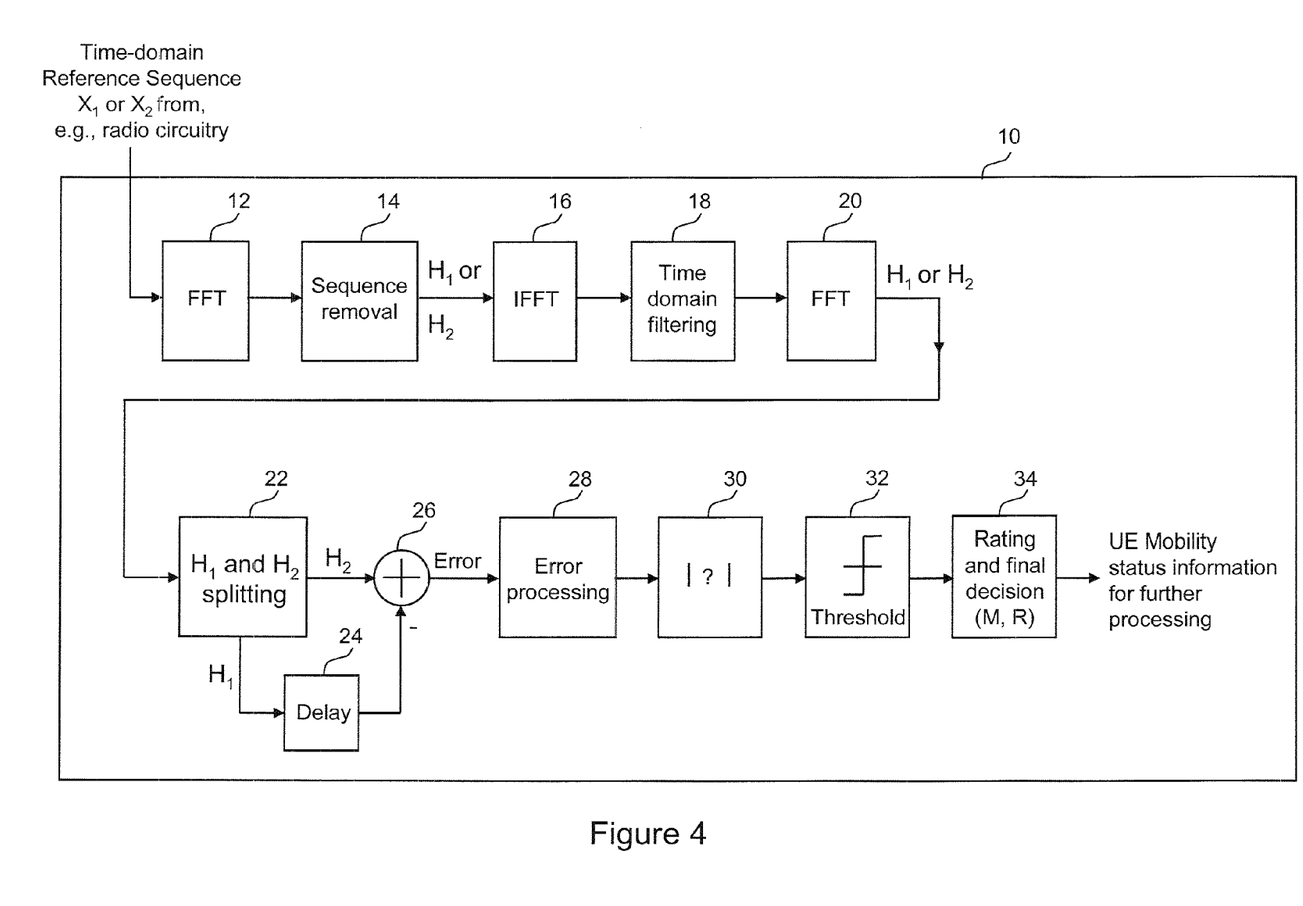
FIG. 4 is a non-limiting, example functional block diagram of processing circuitry for the network node.

FIG. 4 is a non-limiting, example functional block diagram of processing circuitry for the network node that performs the steps in FIG. 3. Each function of the processing circuitry is now described. Initially, signals containing time-domain reference sequences $x_1$ and $x_2$ are received after being converted to baseband from RF, e.g., by radio circuitry in the network node or some other node, and processed in processing circuitry 10. A fast frequency transform (FFT) unit 12 receives the signals time-domain reference sequences $x_1$ and $x_2$ and transforms them into the frequency domain. A sequence removal unit removes the two reference sequence from their respective received signals by multiplying the complex conjugates of each reference sequence denoted by $x_1^*$ and $x_2^*$, which are known to the network node, with the received signals. The sequence removal produces $\underline{H}_1$ and $\underline{H}_2$ which represent channel frequency response symbols corresponding to $x_1$ and $x_2$, respectively.

In reality, $\underline{H}_1$ and $\underline{H}_2$ could be mixed with noise and interference during the transmission and thus they need to be further processed by noise suppression filtering before they are used to determine the UE mobility status. In general, this noise suppression filtering can be done either in the frequency domain or in the time domain. FIG. 4 shows a non-limiting example where a time domain filter 18 is used. Consider for example an uplink v-MIMO application of the technology where two identical DMRSs with an 180° offset from a pair of UEs occupy the same frequency and time resources. Under such an example circumstance, $\underline{H}_1$ and $\underline{H}_2$ each contains two channel frequency responses each corresponding to one UE, respectively, which must be separated by filtering. Filtering in the time domain is preferred here to take advantage of the 180° offset between the two reference sequences from the two paired UEs. Time domain filtering can be any form that is effective. For example, a maximum sample-based, time windowing filter may be a good candidate for this time domain filtering in the application of PUSCH channel estimation with v-MIMO. This type of filtering locates the maximum magnitude sample of the input time sequence and uses a time window to filter out those samples far enough away from the maximum sample. The filter then outputs the remaining samples around the maximum sample. The time window width is a design parameter that depends on a maximal time spread of the channel responses in the deployed sites. In order to perform time domain filtering, an IFFT unit 16 and an FFT unit 20 are needed. The IFFT unit 16 converts the $\underline{H}_1$ and $\underline{H}_2$ frequency responses into the time domain, and FFT unit 20 converts the time filter output back into the frequency domain.

A splitter unit 22 splits the two, time domain-filtered complex sequences $H_1$ and $H_2$ representing the two channel frequency response sequences corresponding to $x_1$ and $x_2$. These two frequency domain complex sequences are the inputs to the UE mobility status determination procedures. To generate an error between the channel frequency response sequences at two different times, the splitter 22 routes $H_1$ and $H_2$ to two different paths. For example, $H_1$ is delayed in a delay unit 24. The delay unit compensates for a timing difference between $H_1$ and $H_2$. The amount of delay may be determined based on the time interval between the two reference sequences and is also preferably dependent on the application of the technology. An error determination unit 26 determines an error between $H_1$ and $H_2$, e.g., a difference by subtracting $H_1$ from $H_2$ sample-by-sample, which corresponds to signal on a subcarrier in a RB. The mathematical details for accomplishing this are set forth in the formulas below.

The error is processed by error processing unit 28 based on one or more criteria. The error processing algorithm can be any form that provides a meaningful metric that permits an effective determination of the UE mobility status based on the metric. Non-limiting example metric candidates are now described.

One example metric may be a mean error metric. The mean error of $H_1$ and $H_2$ may be calculated, for example, as follows where N is the number of subcarriers contained by $H_1$ and $H_2$:

$$H_1 = (h_{1,1}, \ldots, h_{1,i}, \ldots, h_{1,N})$$

where $$h_{1,i} = \text{real}(h_{1,i}) + j \cdot \text{imag}(h_{1,i}) \text{ for } i = 1, 2, \ldots, N.$$

$$H_2 = (h_{2,1}, \ldots, h_{2,i}, \ldots, h_{2,N})$$

where $$h_{2,i} = \text{real}(h_{2,i}) + j \cdot \text{imag}(h_{2,i}) \text{ for } i = 1, 2, \ldots, N.$$

$$\text{error} = H_2 - H_1 = (h_{2,1} - h_{1,1}, \ldots, h_{2,i} - h_{1,i}, \ldots, h_{2,N} - h_{1,N})$$

$$\text{Metrics} = \text{mean(error)} = \frac{1}{N} \sum_{i=1}^{N} (h_{2,i} - h_{1,i})$$

$$= \frac{1}{N} \sum_{i=1}^{N} h_{2,i} - \frac{1}{N} \sum_{i=1}^{N} h_{1,i}$$

$$= f(H_2) - f(H_1)$$

where $$f(H_1) = \text{real}(f(H_1)) + j \cdot \text{imag}(f(H_1))$$

$$= \frac{1}{N} \sum_{i=1}^{N} h_{1,i}$$

$$= \frac{1}{N} \sum_{i=1}^{N} \text{real}(h_{1,i}) + j \cdot \frac{1}{N} \sum_{i=1}^{N} \text{imag}(h_{1,i}) \text{ and}$$

$$\text{real}(f(H_1)) = \frac{1}{N} \sum_{i=1}^{N} \text{real}(h_{1,i}),$$

-continued $$\text{imag}(f(H_1)) = \frac{1}{N} \sum_{i=1}^{N} \text{imag}(h_{1,i})$$

$$f(H_2) = \text{real}(f(H_2)) + j \cdot \text{imag}(f(H_2))$$

$$= \frac{1}{N} \sum_{i=1}^{N} h_{2,i}$$

$$= \frac{1}{N} \sum_{i=1}^{N} \text{real}(h_{2,i}) + j \cdot \frac{1}{N} \sum_{i=1}^{N} \text{imag}(h_{2,i}) \text{ and}$$

$$\text{real}(f(H_2)) = \frac{1}{N} \sum_{i=1}^{N} \text{real}(h_{2,i}),$$

$$\text{imag}(f(H_2)) = \frac{1}{N} \sum_{i=1}^{N} \text{imag}(h_{2,i})$$

Figure 5:
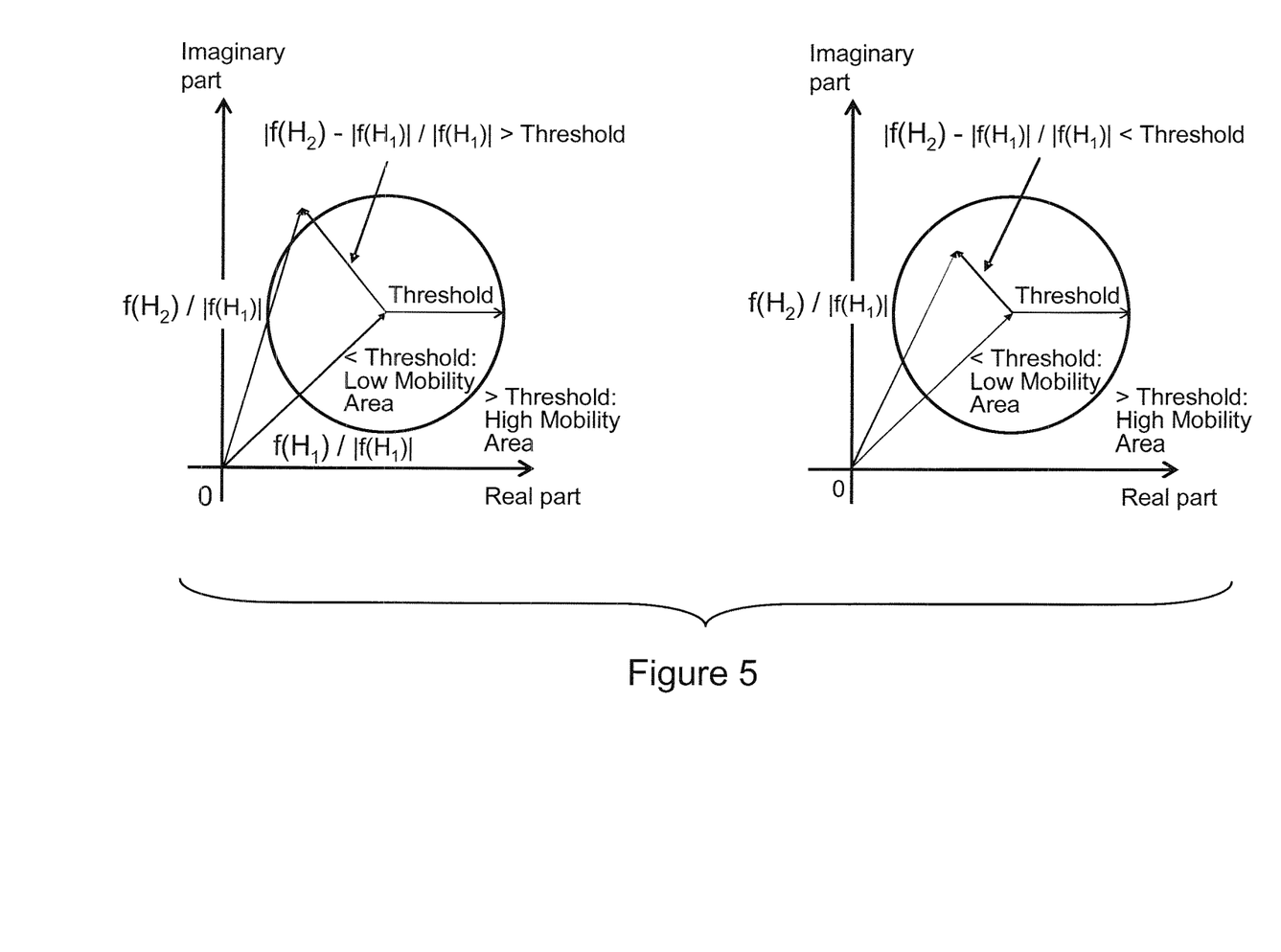
FIG. 5 is a diagram illustrating in complex space an example of UE mobility status determination.

FIG. 5 shows the geometric explanation of the generation of this metric which is normalized by the magnitude of $f(H_1)$.

Another example metric is a mean square error that calculates the mean squared error of $H_1$ and $H_2$. An example calculation is provided below with the same definitions of $H_1$ and $H_2$.

$$\text{Metrics} = \frac{\sum_{i=1}^{N} |h_{2,i} - h_{1,i}|^2}{\sqrt{\sum_{i=1}^{N} |h_{1,i}|^2 \cdot \sum_{i=1}^{N} |h_{2,i}|^2}}$$

A third example is a normalized correlation metric that calculates the correlation between $H_1$ and $H_2$ normalized by the product of their magnitudes. The calculation below uses the same definitions of $H_1$ and $H_2$.

$$\text{Normalized correlation metrics} = \frac{\text{Real}(H_2^H \cdot H_1)}{\sqrt{|H_1|^2 \cdot |H_2|^2}}$$

$$= \frac{\text{Real}\left(\sum_{i=1}^{N} h_{2,i} \cdot h_{1,i}^*\right)}{\sqrt{\sum_{i=1}^{N} |h_{1,i}|^2 \cdot \sum_{i=1}^{N} |h_{2,i}|^2}}$$

where ( )* stands for its complex conjugate.

As mentioned earlier, the metric(s) can be any form as long as it is meaningful and effective to reflect the channel characteristic variation due to the UE mobility. A general error metric(s) form may be written as a function of the error between $H_1$ and $H_2$ denoted by $g(H_2,H_1)$ which is a measure of the UE mobility status in terms of a limited number of discrete UE mobility states defined and determined by a set of thresholds. With one threshold, two UE mobility states are defined: LOW status and HIGH status. Such two-state information about UE mobility is sufficient for many applications. But the number of UE mobility states could be more than two depending on which may be useful for applications that would benefit from further granularity of UE mobility status. For example, three UE mobility states could be defined using two thresholds, four UE mobility states could be defined using three thresholds, etc.

The error processing in unit 28 may be performed "per UE," "per RB," or a group of RBs. Reference sequence processing handled on a per-UE basis means that the processing is with respect to each UE. But the entire occupied frequency band may also be treated as a whole regardless of whether it is being used by one UE or multiple UEs. In this case, the error metric(s) is determined RB-by-RB (instead of UE-by-UE) showing how much the channel characteristic response varies over each particular RB according to one or more suitably designed thresholds. As compared to processing per UE, this type of handling may produce additional benefits for some application such as unlink channel estimation.

Consider, for example, an application with PUSCH channel estimation and a dual-UE mobility status (HIGH/LOW) algorithm. The goal is to leverage the fact that different RBs may experience different channel variation in the frequency domain even if the UE moves at a constant speed. This allows the channel estimation to account for different RBs to exploit frequency diversity from channel variation.

Another benefit of processing per RB is reduced implementation costs because there is no longer a need to identify each particular UE. Eliminating UE identification frees up processing resources for other tasks. Another processing per RB benefit is the enablement of parallel processing of channel estimation and MRC/IRC combining. Because MRC/IRC combining can be done per RB, there is no need to wait until the entire band channel estimation is completed. Another benefit with processing per RB is that more measurement events can be generated to improve the rate measurement statistically.

The following non-limiting example steps may be used to perform error processing per RB by the unit 28, taking uplink channel estimation as an example. First, set the number of subcarriers parameter N to 12 for each RB with respect to a frequency spacing of 15 KHz (in this example). Second, calculate the error metric RB-by-RB and independently of those UEs which occupy different portions of the frequency band concerned by the uplink channel estimation. Third, determine the channel variation over each RB across two different time instants by comparing the error metric of each RB with a predefined magnitude threshold. Finally, apply either an averaging algorithm if the UE mobility status is LOW or an interpolation algorithm if the UE mobility status is HIGH to each RB for channel estimation.

As mentioned earlier, the value of the parameter N is preferably sufficiently large with respect to noise suppression. If N is too small, then the noise suppression filtering may be too weak leaving considerable residual noise in the calculated metric that could adversely affect the accuracy of the metric. For error processing per RB or group of RBs, this is not an issue because a RB containing 12 subcarriers for example ensures that the parameter N is not too small with respect to noise suppression, and the remaining effect can be further reduced by properly selecting the magnitude threshold. Therefore, the sufficient accuracy of the UE mobility status determination can be attained for the error processing per RB. On the other hand, a single RB in a LTE system has a bandwidth of 180 KHz, which is less than the coherence bandwidth of most of fading channels at frequency carriers in many applications. As a result, the variation of channel frequency response within an RB is normally small. Noise suppression can be further enhanced by performing a moving averaging on the channel characteristic response of each RB before calculating the metric without suffering significant distortion generated by the moving averaging on the channel characteristic response.

Returning to FIG. 4, a magnitude determination unit 30 determines a magnitude of the processed error metric. The magnitude of the processed error metric is compared by a threshold unit 32 to make an initial determination on the degree of channel variation. The magnitude of the processed error metric is then compared with a threshold in thresholding unit 32. For a single threshold example, when the magnitude of the error metric exceeds the threshold, the UE mobility status is determined to be HIGH status; otherwise, it is LOW status.

An example of this thresholding process is graphically depicted in FIG. 5 with a mean error metrics example. The complex plane is divided into two decision areas by a circle whose radius is equal to the threshold. If the error metric falls into the circle area, then the UE mobility status is in a state of LOW UE mobility status due to a small variation on the channel characteristic response across two time instants.

A rating and final determination unit 34 receives the decision from the thresholding unit 32. Although one error may be sufficient for the UE mobility determination, better results may be obtained if the error determination and thresholding process is performed for multiple iterations over multiple different time instants. The rating and final determination unit 34 can then count the number of iterations that resulted in each UE mobility status, e.g., a LOW UE mobility status or a HIGH UE mobility status (assuming only two UE mobility states in this example), is determined by the initial UE mobility determination along with the subsequent iterations over M times, where M is an integer. The rate r may be defined in the two-state example as $$r = \frac{\text{number of LOW events}}{M}.$$

In the multiple iteration situation, the final UE mobility status determination is based on a rate threshold comparison. If r>R, then the UE is in the state of LOW UE mobility status; otherwise, it is in the state of HIGH UE mobility status, where R is a predetermined real number, e.g., between 0 and 1.

Several non-limiting example methods for "event counting" by unit 34 are now described for the non-limiting two UE mobility state (HIGH/LOW) situation. In one example, the event may be counted per RB using two reference symbols per transmission time intervals (TTIs). If the calculated metric for each RB per TTI is greater than the threshold, then a HIGH event is counted. Otherwise, a LOW event is counted. Another example counts events per UE using two reference symbols per TTI. If the calculated metric for each UE per TTI is greater than the threshold, then a HIGH event is counted. Otherwise, a LOW event is counted. A third method uses a sounding reference signal (SRS) for calculating the LOW or HIGH events. Two adjacent SRS symbols separated by at least two milliseconds are used to calculate the metrics. If the calculated metrics is greater than the threshold, then a HIGH event is counted. Otherwise, a LOW event is counted. Another method uses the channel responses estimated using decoded data, e.g., from the PUSCH or PUCCH, after passing CRC check or the like. Two correctly-decoded data symbols separated by a pre-defined interval are first used to estimate their corresponding channel responses, which are then used to calculate the metric in a similar way as the previous methods.

If the calculated metric is greater than the threshold, then a HIGH event is counted. Otherwise, a LOW event is counted.

The design parameters, M and R, like the threshold(s) used in thresholding unit 32 may be any suitable values. One non-limiting example method for determining suitable values is through performance simulations and lab testing in terms of the applications to be used. Step 1: An appropriate reference sequence type (e.g., DMRS, SRS, PUSCH, or PUCCH), time interval, and the error processing operation mode (processing per UE, per RB, or a group of RBs) are determined and may be based on a particular technology application which needs to know UE mobility status as well as on design tradeoffs between performance and implementation complexity. This in turn determines the number of subcarriers used in the metrics calculation. As one non-limiting example, N could be 12 if error processing per RB is used. Step 2: The number of states and the corresponding number of thresholds which can identify each state are determined for the application. Step 3: The metrics type to be used in the calculation may be selected based on design tradeoffs between performance and implementation complexity. Step 4: A performance simulator is created for the system, e.g., a LTE system, and the application requirements. The simulator simulates the reference sequence transmission with the reference signal model, the SRS signal transmission, the PUSCH transmission or the PUCCH transmission for UE uplink channel estimation, UE mobility measurement and the functionalities for the units shown in FIG. 4. Step 5: Simulations are run on a computer to generate system performance curves such as block error rate against the ratio of signal to interference plus noise, versus different values of threshold, M and R under various channel conditions. Other curves may be used depending on the particular application. Step 6: The required threshold, M, and R are then selected based on the performance curves produced from the simulations in order to achieve the intended purposes/objectives for the application. After the threshold, M, and R selection, verification through lab testing may be useful in order to fine-tune the selected values.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for determining a radio user equipment (UE) mobility status in a radio communications node, comprising the steps of:
a-performing UE mobility status measurements associated with the UE communicating over a radio channel, where the UE mobility status corresponds to a degree of variation of the radio channel over at least one of time and frequency;
b-determining a channel characteristic of the radio channel at a first time represented as a first complex domain vector;
c-determining a channel characteristic of the radio channel at a second later time represented as a second complex domain vector;
d-determining a channel characteristic error metric in the complex domain based on a distance between the first complex domain vector and the second complex domain vector;
e-comparing the channel characteristic error metric to a predetermined threshold; and
f-determining the UE mobility status based on the threshold comparison,
wherein a value of the channel characteristic error metric larger than the predetermined threshold represents a higher mobility and a value of the channel characteristic error metric smaller than the predetermined threshold represents a lower mobility.

2. The method in claim 1, wherein one factor affecting the UE mobility status is movement of the UE from the first time to the second time.

3. The method in claim 1, wherein the UE mobility status includes a first state corresponding to a higher UE mobility status indicating a higher degree of channel variation and a second state corresponding to a lower UE mobility status indicating a lower degree of channel variation.

4. The method in claim 3, wherein the UE mobility status includes three or more different UE mobility states and two or more different predetermined thresholds.

5. The method in claim 1, wherein the UE mobility status is determined per UE.

6. The method in claim 1, wherein the UE mobility status is determined per at least one radio resource block, where a radio resource block may be allocated to multiple UEs at the same time for radio communication.

7. The method in claim 6, wherein the channel characteristic is determined at the first time and at the second later time are produced based on N subcarriers, N being a variable integer greater than one, and wherein a value of N is set large enough to achieve a desired noise suppression.

8. The method in claim 1, further comprising:
performing steps a-e for multiple iterations, where a result of each iteration is a UE mobility state event corresponding to one of multiple different possible UE mobility states, and
determining the UE mobility status based on UE mobility state events resulting from the multiple iterations.

9. The method in claim 8, further comprising:
determining an event rate corresponding to one of the multiple different possible UE mobility states produced over a number of iterations performed divided by the number of iterations performed;
comparing the determined event rate to a predefined rate threshold; and
determining the UE mobility status based on the rate threshold comparison.

10. The method in claim 9, further comprising determining the event rate per at least one radio resource block over a predetermined time interval, where at least one radio resource block may be allocated to multiple UEs at the same time for radio communication.

11. The method in claim 9, further comprising determining the event rate per a group of multiple radio resource blocks over a predetermined time interval.

12. The method in claim 9, further comprising determining the event rate per UE over a predetermined time interval.

13. The method in claim 1, wherein the UE mobility status measurements include receiving an uplink transmission including a reference sequence from the UE at the first time and then using the reference sequence to determine the channel characteristic of the radio channel at the first time and then using a reference sequence received at the second later time to determine the channel characteristic of the radio channel at the second time.

14. The method in claim 13, wherein different types of reference sequences are used for different applications.

15. The method in claim 14, wherein a time interval between the first time and the second time depends on the type of reference sequence used.

16. The method in claim 13, wherein each reference sequence includes a number of frequency subcarriers, and wherein the number of frequency subcarriers depends on a configuration or made by the radio communications node.

17. The method in claim 13, wherein processing of the reference sequences to determine the channel characteristic is performed per radio resource block for a first application of the method and is performed per UE for a second different application of the method.

18. The method in claim 1, wherein the UE mobility status measurements include receiving an uplink transmission including data symbols transmitted from the UE, the method further comprising:
decoding the data symbols,
checking the decoded data symbols for accuracy,
using UE transmitted data symbols reconstructed from at least one accurately decoded data symbol at least one of the first time and second time to determine the channel characteristic of the radio channel at least the one of the first time and second time.

19. The method in claim 18, wherein the data symbols are either payload data symbols or signaling data symbols.

20. The method in claim 1, further comprising:
using the determined UE mobility status for uplink channel estimation such that a first type of channel estimation algorithm is used when the determined UE mobility status is in a first state and a second type of channel estimation algorithm is used when the determined UE mobility status is in a second different state.

21. The method in claim 20, wherein the UE mobility status for uplink channel estimation is determined per radio resource block.

22. The method in claim 21, further comprising using a first type of channel estimation algorithm for one radio resource block and using a second different type of channel estimation algorithm for another radio resource block.

23. The method in claim 20, wherein the UE mobility status for uplink channel estimation is determined per group of multiple radio resource blocks.

24. The method in claim 1, further comprising:
using the determined UE mobility status for selecting a MIMO scheme for use at the radio communications node such that a first type of MIMO scheme is used when the determined UE mobility status is in a first state and a second type of MIMO scheme is used when the determined UE mobility status is in a second different state.

25. The method in claim 24, further comprising identifying one or more UEs whose UE mobility status is in a low state for a downlink closed-loop MIMO application, and identifying one or more UEs whose mobility status is low for an uplink multi-user MIMO application.

26. The method in claim 1, further comprising:
using the determined UE mobility status for selecting an adaptive antenna beamforming scheme for use at the radio communications node such that a first type of adaptive antenna beamforming scheme is used when the determined UE mobility status is in a first state and a second type of adaptive antenna beamforming scheme is used when the determined UE mobility status is in a second different state.

27. The method in claim 26, wherein for a low UE mobility status, multi-antenna beamforming adaptation is selected, and for a high UE mobility status, a single beam antenna scheme is selected.

28. The method in claim 1, wherein the channel characteristic error metric includes one of the following: a mean error determined in the frequency domain between the first complex domain vector and the second complex domain vector and a correlation in the frequency domain between the first complex domain vector and the second complex domain vector.

29. A radio network node apparatus for determining a radio user equipment (UE) mobility status in a radio communications node, comprising data:
radio circuitry for communicating with the UE, and
processing circuitry, coupled to the radio circuitry, configured to execute the following computer-implemented operations:
a-determine UE mobility status measurements associated with the UE communicating with the radio network node over a radio channel via the radio circuitry, where the UE mobility status corresponds to a degree of variation of the radio channel over at least one of time and frequency;
b-determine a channel characteristic of the radio channel at a first time represented as a first complex domain vector;
c-determine a channel characteristic of the radio channel at a second later time represented as a second complex domain vector;
d-determine a channel characteristic error metric in the complex domain based on a distance between the first complex domain vector and the second complex domain vector;
e-compare the channel characteristic error metric to a predetermined threshold; and
f-determine the UE mobility status based on the threshold comparison,
wherein a value of the channel characteristic error metric larger than the predetermined threshold represents a higher mobility and a value of the channel characteristic error metric smaller than the predetermined threshold represents a lower mobility.

30. The apparatus in claim 29, wherein the UE mobility status includes a first state corresponding to a higher UE mobility status indicating a higher degree of channel variation and a second state corresponding to a lower UE mobility status indicating a lower degree of channel variation.

31. The apparatus in claim 30, wherein the UE mobility status includes three or more different UE mobility states and two or more different predetermined thresholds.

32. The apparatus in claim 29, wherein the data processor is configured to determine the UE mobility status per UE.

33. The apparatus in claim 29, wherein the processing circuitry is configured to determine the UE mobility status per at least one radio resource block, where a radio resource block may be allocated to multiple UEs at the same time for radio communication.

34. The apparatus in claim 29, wherein the processing circuitry is configured to:
perform a-e for multiple iterations, where a result of each iteration is a UE mobility state event corresponding to one of multiple different possible UE mobility states, and
determine the UE mobility status based on UE mobility state events resulting from the multiple iterations.

35. The apparatus in claim 34, wherein the processing circuitry is configured to:
determine an event rate corresponding to a number of one of the multiple different possible UE mobility states produced over a number of iterations performed divided by the number of iterations performed;
compare the determined event rate to a predefined rate threshold; and
determine the UE mobility status based on the rate threshold comparison.

36. The apparatus in claim 35, wherein the processing circuitry is configured to determine the event rate per radio resource block over a predetermined time interval, where a radio resource block may be allocated to multiple UEs at the same time for radio communication.

37. The apparatus in claim 35, wherein the processing circuitry is configured to determine the event rate per UE over a predetermined time interval.

38. The apparatus in claim 29, wherein the processing circuitry is configured to receive and use a reference sequence in an uplink UE transmission at the first time to determine the channel characteristic of the radio channel at the first time and receive and use a reference sequence in the uplink UE transmission at the second later time to determine the channel characteristic of the radio channel at the second time.

39. The apparatus in claim 38, wherein the processing circuitry is configured to process the reference sequences to determine the channel characteristic per at least one radio resource block for a first application of the method and per UE for a second different application of the method.

40. The apparatus in claim 29, wherein the radio network node is a radio base station.

41. The apparatus in claim 29, wherein the processing circuitry is configured to determine the UE mobility status for uplink channel estimation per radio resource block.

42. The apparatus in claim 41, wherein the processing circuitry is configured to use a first type of channel estimation algorithm for one radio resource block and use a second different type of channel estimation algorithm for another radio resource block.

43. The apparatus in claim 29, wherein the processing circuitry is configured to determine the UE mobility status for uplink channel estimation per group of multiple radio resource blocks.

44. The apparatus in claim 29, wherein the UE mobility status measurements include receiving an uplink transmission including data symbols from the UE, and wherein the processing circuitry is configured to decode the data symbols, check the decoded data symbols for accuracy, and then use the UE transmitted data symbols reconstructed from a first accurately decoded data symbol at the first time to determine the channel characteristic of the radio channel at the first time and then use the UE transmitted data symbols reconstructed from a second accurately decoded data symbol at the second later time to determine the channel characteristic of the radio channel at the second time.

45. The apparatus in claim 29, wherein the channel characteristic error metric includes one of the following: a mean error determined in the frequency domain between the first complex domain vector and the second complex domain vector and a correlation between the first complex domain vector and the second complex domain vector.

\* \* \* \* \*